(12) United States Patent
Krimmel et al.

(10) Patent No.: US 10,953,454 B2
(45) Date of Patent: Mar. 23, 2021

(54) METHOD FOR PRODUCING A STEERING SHAFT PART AND STEERING SHAFT FOR A MOTOR VEHICLE

(71) Applicants: THYSSENKRUPP PRESTA AG, Eschen (LI); thyssenkrupp AG, Essen (DE)

(72) Inventors: Achim Krimmel, Wezikon (CH); Herbert Müntener, Ruggell (LI); Werner Gstach, Frastanz (AT); Willem Ambagtsheer, Waldstatt (CH)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 66 days.

(21) Appl. No.: 16/321,518

(22) PCT Filed: Aug. 1, 2017

(86) PCT No.: PCT/EP2017/069377
§ 371 (c)(1),
(2) Date: Jan. 29, 2019

(87) PCT Pub. No.: WO2018/024701
PCT Pub. Date: Feb. 8, 2018

(65) Prior Publication Data
US 2019/0168281 A1 Jun. 6, 2019

(30) Foreign Application Priority Data
Aug. 1, 2016 (DE) ...................... 10 2016 214 163.5

(51) Int. Cl.
*B21D 39/04* (2006.01)
*B21D 53/88* (2006.01)
(Continued)

(52) U.S. Cl.
CPC ........... *B21D 39/04* (2013.01); *B21D 39/046* (2013.01); *B21D 53/88* (2013.01); *B62D 1/16* (2013.01);
(Continued)

(58) Field of Classification Search
CPC .... B21D 39/04; B21D 39/046; B21D 39/048; B21D 39/20; B21D 41/045; B21D 9/04;
(Continued)

(56) References Cited

U.S. PATENT DOCUMENTS 4,561,799 A 12/1985 Arena
2009/0051153 A1* 2/2009 Allgauer ................. F16D 1/072
280/778

FOREIGN PATENT DOCUMENTS

DE 197 50 005 C 4/1999
DE 10 2006 010 228 B 11/2007
(Continued)

OTHER PUBLICATIONS

English Translation of International Search Report issued in PCT/EP2017/069377, dated Oct. 24, 2017.

*Primary Examiner* — Jermie E Cozart
(74) *Attorney, Agent, or Firm* — thyssenkrupp North America, LLC

(57) ABSTRACT

A method may be utilized to produce a steering spindle part configured as a hollow shaft and having a connecting portion at its end. At least a part of the connecting portion includes increased wall thickness relative to a portion of the steering spindle part adjoining the connecting portion. The method may involve providing a circular, hollow cylindrical tube with an inner surface that is smooth in a circumferential direction, providing a circular, hollow cylindrical sleeve with an outer surface that is smooth in a circumferential direction, inserting the sleeve into an end portion of the tube, (Continued)

and jointly deforming the end portion of the tube and the sleeve such that a flow of material occurs. This flow may form positively locking elements on the tube and the sleeve that engage into one another in the circumferential direction and generate positive locking in the circumferential direction.

20 Claims, 3 Drawing Sheets

(51) Int. Cl.
*B62D 1/16* (2006.01)
*B21D 41/04* (2006.01)
*F16D 1/072* (2006.01)
*F16D 1/108* (2006.01)
*F16D 3/06* (2006.01)
*F16C 3/02* (2006.01)
*F16C 3/03* (2006.01)
*B21D 39/20* (2006.01)
*B21D 9/04* (2006.01)

(52) U.S. Cl.
CPC ............... *F16C 3/02* (2013.01); *F16C 3/03* (2013.01); *F16D 1/072* (2013.01); *F16D 1/108* (2013.01); *F16D 3/06* (2013.01); *B21D 9/04* (2013.01); *B21D 39/048* (2013.01); *B21D 39/20* (2013.01); *B21D 41/045* (2013.01); *Y10T 29/49913* (2015.01); *Y10T 29/49927* (2015.01); *Y10T 29/49929* (2015.01)

(58) Field of Classification Search
CPC .. B21D 53/88; B62D 1/16; B62D 1/20; F16C 3/03; F16D 1/072; Y10T 29/49913; Y10T 29/49929
See application file for complete search history.

(56) References Cited

FOREIGN PATENT DOCUMENTS

| | | |
|---|---|---|
| DE | 10 2009 038 316 A | 2/2011 |
| GB | 1270684 A | 4/1972 |
| WO | 2007/098513 A | 9/2007 |

* cited by examiner

METHOD FOR PRODUCING A STEERING SHAFT PART AND STEERING SHAFT FOR A MOTOR VEHICLE

CROSS REFERENCE TO RELATED APPLICATIONS

This application is a U.S. National Stage Entry of International Patent Application Serial Number PCT/EP2017/069377, filed Aug. 1, 2017, which claims priority to German Patent Application No. DE 10 2016 214 163.5, filed Aug. 1, 2016, the entire contents of both of which are incorporated herein by reference.

FIELD

The present disclosure generally relates to steering spindles, including methods for producing steering spindle parts that form portions of steering spindles for motor vehicles.

BACKGROUND

A steering spindle for a motor vehicle commonly comprises multiple steering spindle parts, which each form a portion of the steering spindle. The steering wheel is fixed to the rearmost steering spindle portion in relation to the direction of travel, at the rear end of said steering spindle portion. A pinion of a steering gear is commonly fixed to the foremost steering spindle portion in relation to the direction of travel, at the front end of said steering spindle portion. Aside from steering spindle parts which can be connected to one another by means of universal joints, steering spindle parts which are displaceable relative to one another and telescopable relative to one another in an axial direction are provided, which serve for the adjustment of the length of the steering column and/or for absorbing longitudinal displacements in the event of a crash.

In a known embodiment, the steering wheel is attached to the rearmost steering spindle part by means of a screw connection. For this purpose, the steering spindle part in the form of a hollow shaft comprises, at an end side, a connecting portion which, proceeding from the end of the steering spindle part, comprises a substantially hollow cylindrical portion and, adjoining the latter, a conical portion, which widens toward the middle of the steering spindle part. The hollow cylindrical portion is equipped with an internal thread and an external toothing. The external toothing engages into an internal toothing of the hub of the steering wheel and, by means of the internal thread, the screw connection of the steering wheel to the steering spindle part is realized. Here, the steering spindle part must comprise an adequately large wall thickness in the connecting portion, in particular in the hollow cylindrical end portion. This is greater than the wall thickness, required for transmitting the torque, over the rest of the length of the tubular steering spindle part. Therefore, to form the steering spindle part, use is conventionally made of tubes which initially comprise a greater wall thickness than that which is required-aside from in the connecting portion. The tube is then machined over its entire length extent, in particular by hammering or similar deformation methods, for example swaging or rotary swaging. Here, in the connecting portion, the diameter of the tube is reduced. Over the rest of the length of the tube, the wall thickness of the tube is reduced. Here, it is however also possible for structures to be formed in over portions of the tube, which structures serve for example for the connection to a further steering spindle part in a manner which permits telescopic movement but not relative rotation and fixedly in terms of torque. The formation of such contours, in particular in the form of spiral toothings or cloverleaf profiles is known. For example, DE 197 50 005 C1 presents steering spindle parts with such contours.

To generate the relatively large wall thickness in the region of the connecting portion, it is known for a sleeve in the form of a tube portion to be inserted into the end of the tube and for the sleeve to be non-detachably connected to the tube. EP 1 989 011 B1 describes, for the generation of the connection of the sleeve to the tube, the initial insertion of the sleeve into the tube and the subsequent joint deformation of the tube and the sleeve. The deformation provides for the tube to be plastically deformed by means of a pressure deformation method performed at cold temperatures, such as hammering or swaging, wherein said tube is pressed with its inner surface from the outside, that is to say radially with respect to the longitudinal axis, against the outer surface of the sleeve, such that said tube is plastically molded on and a non-positively locking connection is produced between the surfaces pressed against one another.

In the known prior art, as starting material, use is made of a hollow cylindrical tube with an inner surface which is smooth in a circumferential direction and which comprises a circular cross section, and which in other words forms a cylindrical inner shell surface with a cross section in the shape of a circular line. This smooth tube is connected by means of its inner surface to the outer surface of the sleeve by pressure deformation, which sleeve, in a known embodiment, comprises a cylindrical outer shell surface likewise with a cross section in the shape of a circular line. During the pressure deformation, the two shall surfaces are placed in permanent contact, whereby a non-positively locking connection is formed for the transmission of the steering moment from the steering wheel into the steering spindle.

In order for this connection fixed in terms of torque to be made more highly loadable, it is proposed in EP 1 989 011 B1 that the sleeve, before being inserted into the tube, be equipped with a knurling or circumferential toothing on its outer surface. The structures protruding radially from the circular cross section of the sleeve here, such as knurling serrations or teeth, dig into the inner surface of the tube during the deformation, and thus form positive-locking elements, by means of which a positively locking connection acting in the circumferential direction is realized.

A positively locking connection acting in the circumferential direction counteracts a relative rotation of the tube in the sleeve and thus permits the reliable transmission of relatively high torques, such as may arise during the preloading (tightening) of the screw connection for the fixing of the steering wheel to the steering spindle. The known production method however necessitates that the positive-locking elements be formed on the sleeve prior to the insertion. For this purpose, a separate machining step is necessary, whereby the manufacturing outlay is increased.

Thus a need exists for methods that permit the production of a highly loadable connection portion with lower manufacturing outlay.

DETAILED DESCRIPTION

Figure 1:
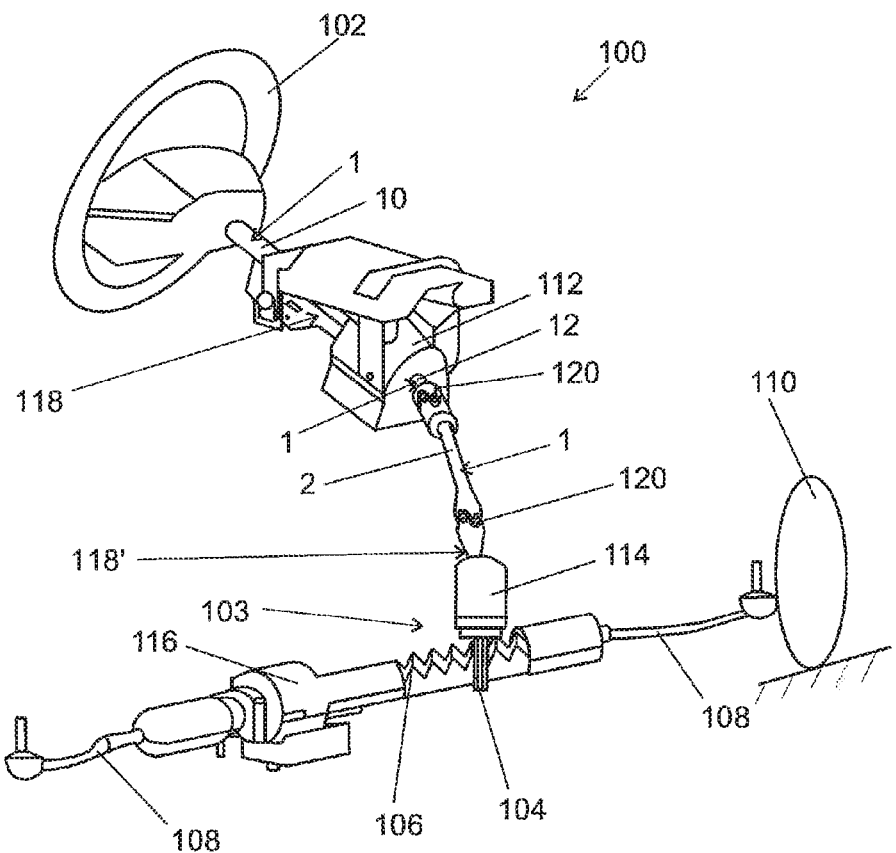
FIG. 1 is a schematic view of an example motor vehicle steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to methods for producing a steering spindle part that forms a portion of a steering spindle for a motor vehicle. In some examples, the steering spindle part may be configured as a hollow shaft, and at least at one of its ends may comprise a connecting portion, which at least over a part of its length comprises an increased wall thickness relative to a portion of the steering spindle part adjoining the connecting portion. Some example methods may involve providing a hollow cylindrical tube with an inner surface that is smooth in a circumferential direction and that has a circular cross section, providing a hollow cylindrical sleeve, inserting the sleeve into an end portion of the tube, jointly deforming the end portion of the tube and the sleeve such that a flow of a material of the tube and the sleeve occurs.

In some examples, a hollow cylindrical sleeve may comprise an outer surface which is smooth in the circumferential direction and which comprises a circular cross section. As a result of the flow of the material, positive-locking elements which engage into one another in the circumferential direction may be formed on the tube and on the sleeve for the purposes of generating positive locking which acts in the circumferential direction.

According to the invention, a smooth sleeve is used which comprises an outer surface with a circumference in the shape of a circular line in cross section. This refers to an outer circumferential surface with a cylindrical shape from which no structures such as teeth, serrations or other projections protrude outward, and into which no structures such as grooves, channels or depressions of any other form are formed. The circumference is continuously circular.

In the method according to the invention, during the connection, as a result of the deformation that occurs in the process, structures which engage into one another in positively locking fashion are generated, specifically on the tube and, correspondingly thereto, on the sleeve. During the deformation, the material is plastically deformed, as is known per se. Whereas it is however the case in the prior art that the associated flow of the material serves only for a connection of services utilizing forms or surface structures that were already present prior to the deformation, the invention utilizes the material flow that occurs during the deformation for targetedly forming positive-locking elements which were not previously present. This yields the advantage that, for the generation of a particularly highly loadable connection no machining of the sleeve or of the tube is necessary in order to provide positive-locking elements prior to the joining-together by deformation. The machining step required in EP 1 989 011 B1 for the introduction of an external toothing or knurling into the outer surface of the sleeve can be omitted. The manufacturing outlay is correspondingly reduced.

The method according to the invention can be realized by virtue of common structuring of tube and sleeve over the circumference being performed during the deformation, rather than the situation in the prior art in which the cross section of the tube is reduced in size in a radial direction uniformly over the entire circumference while maintaining the circular cylindrical basic shape, wherein, in principle, merely a diameter constriction of the tube is effected, similarly to that during shrink-fitting. During the structuring, a controlled deformation of the originally circular cross section, in the shape of a circular line, of the circumferential surfaces, which lie against one another during the connection, into a non-circular cross-sectional shape is performed. By means of the non-circular circumferential surfaces of tube and sleeve which are pressed against one another in non-positively locking fashion during the deformation, positive locking which acts in a circumferential direction is produced between tube and sleeve, in the case of which the molding surfaces, lying against one another in the circumferential direction, of the radially protruding and/or recessed positive-locking elements which deviate from the circular cylindrical shape ensure positively locking engagement fixed in terms of torque.

By contrast to the stated prior art, in which only one of the elements to be joined together, specifically the sleeve, is provided with a toothing or knurling, onto which the other element, specifically the tube, is molded, it is the case in the method according to the invention that both elements, specifically the tube and the sleeve, are simultaneously deformed, and the positive-locking elements are simultaneously formed. The flow of the material takes place on both sides of the joining surfaces lying against one another, specifically the circumferential surfaces of tube and sleeve, such that particularly uniform joining contact is realized. The formation of projections on the inner surface gives rise, according to the invention, to the formation of indentations, which correspond thereto exactly in positively locking fashion, in the outer sleeve pressed against them, and vice versa.

In the method according to the invention, the formation of the positive-locking elements can be realized by virtue of the cross sections of the tube and of the sleeve being jointly deformed into a non-circular shape. A deformation into a non-circular shape may be realized simply by virtue of flattening being performed on one side, as is known from simple shaft-hub connections. One advantageous embodiment provides an arrangement of flattened portions distributed symmetrically over the circumference, for example on mutually opposite sides, or in polygonal prismatic form as a regular triangle, tetragon, pentagon or hexagon, or generally as a regular or irregular polygon.

Deformation into a non-circular shape is to be understood to mean that a circular cylindrical cross-sectional shape as deformed into a cross-sectional contour which deviates from the circular cylindrical shape.

The formation of rounded cross-sectional shapes, which may for example be of oval or elliptical form or formed by a combination of straight and rounded portions, is likewise conceivable. An advantage of rounded forms is the avoidance of local force peaks within the joining surfaces. Furthermore, rounded cross sections can be filled in a particularly effective manner by the material that flows during the deformation.

In the invention, provision may be made whereby, during the joint deformation of the tube and of the sleeve, the outer and inner diameter thereof are reduced at least over a portion of their common length extent. In this way, proceeding from the end of the tube it is possible, as a connecting portion, for firstly a hollow cylindrical portion and, joining this in the direction of the middle of the tube, a conical portion to be formed, which conical portion narrows toward the adjacent end of the tube. The conical portion may in turn be adjoined by a hollow cylindrical portion, in which the outer and inner diameter of the tube and of the sleeve comprise their original value. In the conical portion and in the hollow cylindrical portion at the end side, the inner and outer diameter of the tube and of the sleeve are reduced in relation to their original value.

The deformation is preferably performed by cold working. Here, the deformation is performed without a prior supply of heat, for example by pressure deformation methods such as hammering, swaging or the like.

To carry out the method, provision may be made whereby, for the deformation, a mandrel with non-circular cross section is introduced into the sleeve, and a deformation pressure is exerted on the tube from the outside in order to mold the tube and the sleeve jointly on the mandrel. During the deformation, the deformation pressure exerted from the outside is transmitted via the tube to the sleeve, whereby the latter is pressed against the substantially inflexible mandrel and is plastically deformed. As a result, the non-circular cross-sectional shape is molded into the sleeve from the inside as an imprint. The deformation of the sleeve corresponds to a positively locking engagement of the inner surface of the tube that is pressed on radially from the outside.

The mandrel may for example comprise at least one molding projection which protrudes from its outer side, or multiple molding projections distributed over the circumference. During the deformation, the wall of the sleeve is pressed from the outside against the molding projections, such that these press into the inner side of the sleeve. At the same locations, the sleeve is plastically deformed such that outwardly protruding projections form on the outer surface thereof, which projections form positive-locking elements which act in the circumferential direction. During the joint deformation, said projections are then in turn pressed from the inside plastically into the material of the inner surface of the tube, wherein positive-locking elements in the form of depressions are formed in the inner surface of the tube. In other words, the material of the sleeve flows during the deformation, wherein outwardly protruding positive-locking elements of the sleeve are formed which plastically mold into positive-locking elements, formed here at the same time, in the form of depressions in the inner surface of the tube. It is preferably possible for the outer surface of the mandrel to be of conical form in an axial direction, such that, after the deformation, the mandrel can be easily and freely pulled out of the deformed sleeve.

The mandrel may comprise a deforming mandrel and a first supporting mandrel, wherein the deforming mandrel comprises a deformation portion which, during the deformation, is introduced into the sleeve into the connection portion deformed in the process, and the first supporting mandrel comprises a supporting portion which is inserted into a portion of the tube which adjoins a connecting portion and which is not deformed during the deformation process. The deforming mandrel and the first supporting mandrel may be movable relative to one another. The above-described depressions or flattened portions of the mandrel are situated in the deforming mandrel. Reliable accommodation of the forces that arise during the deformation is thus ensured, such that the desired material flow occurs in the connecting portion, and the tube maintains its shape outside the connecting portion.

The mandrel may preferably comprise a second supporting mandrel in addition to or instead of the first supporting mandrel. The second supporting mandrel interacts with the deforming mandrel, wherein the second supporting mandrel supports the deforming mandrel in the radial direction in the region of the open end of the connecting portion. The second supporting mandrel preferably projects at least partially into the open internal cross section of the sleeve, wherein the second supporting mandrel and the deforming mandrel do not lie against one another in the axial direction, that is to say are not moved into a block state, such that the material flow during the deformation is promoted. The second supporting mandrel preferably comprises a conical outer surface portion which at least partially projects into the open end of the connecting portion. Said conical outer surface portion promotes pulling out of the deformed sleeve with low forces after the deforming operation.

The second supporting mandrel and the deforming mandrel preferably move oppositely in a longitudinal direction before and after the deforming operation; in other words, the deforming mandrel and the second supporting mandrel move toward one another in the longitudinal direction before the deforming operation in order to receive the tube to be deformed and the sleeve, and the deforming mandrel and the second supporting mandrel move away from one another in the longitudinal direction after the deforming operation.

The formation of depressions on the inner surface of the tube may be realized by means of a deforming force applied from the outside uniformly over the circumference of the tube. It can thus be achieved that the tube maintains its cylindrical shape on the outside, and, owing to the material flow during the deformation, positive-locking elements protrude from the outer side of the sleeve, which positive-locking elements are molded in positively locking fashion into the depressions, formed during the deforming process, in the inner side of the tube.

The deforming pressure may be exerted on the tube from the outside by means of at least one deforming tool. The deforming tool may for example comprise a hammer head, by means of which impacts are exerted locally on the outer circumference of the tube in order to generate local radially inwardly directed deformations. In the case of so-called round hammering, one or more such hammer heads are arranged in a manner distributed over the circumference, and, between successive hammer impacts, the tube is rotated relative to the hammer heads about its longitudinal axis. In this way, the tube can be machined together with the sleeve over the entire circumference, for example in order to mold them against an inserted non-circular mandrel. Alternatively, for the deformation, use may be made of swaging or rotary swaging, in the case of which the deforming force required for the deformation is exerted on the tube radially from the outside in the region of the connecting portion in continuous deforming strokes by means of one or more pressure punches or pressure rollers. It is likewise conceivable to implement high-pressure deformation by means of pressurized fluid, which is known as external high-pressure deformation, for example in the hydroforming method. Here, instead of the mechanical deforming tools, a hydraulic high-pressure is built up, by means of which a pressure force is exerted on the outer surface of the tube.

After the joint deformation of the end portion of the tube and of the sleeve, a coupling portion can be formed into the sleeve. As a coupling portion, an internal thread may be formed in the sleeve, and/or a special circumferential contour such as for example a triangle, hexagon or octagon. Such a contour is formed for example in order to form a durable connection to a corresponding inner contour of a hub of a steering wheel or of a fork for a universal joint or of a steering pinion.

The invention furthermore relates to a steering spindle having at least one steering spindle part which forms a portion of a steering spindle for a motor vehicle and which is in the form of a hollow shaft and which, at least at one of its ends, comprises a connecting portion which, at least over a part of its length, comprises an increased wall thickness in relation to a portion of the steering spindle part adjoining the connecting portion, wherein, in the connecting portion of the steering spindle part, within the tube, there is arranged a sleeve which lies against and is rigidly connected at least by way of a non-positively locking connection to the inner wall of the tube. Said steering spindle is characterized according to the invention in that the sleeve and the tube comprise, at least over a part of the length of the connecting portion, positive-locking elements which engage into one another in a circumferential direction and which serve for generating positive locking which acts in the circumferential direction. The positive-locking elements are formed as jointly cold-worked projections and depressions. Here, "jointly cold-worked" means that they are connected to one another simultaneously in a single deformation process, whereby a positively locking connection is produced which ensures improved and more highly loadable engagement between the tube and sleeve on a macroscopic scale.

FIG. 1 schematically illustrates a motor vehicle steering system 100, wherein a driver can input a corresponding steering torque (steering moment) as a steering command into a steering shaft 1 using a steering wheel 102. The steering moment is transmitted by the steering shaft 1 to a steering pinion 104, which meshes with a toothed rack 106, which then in turn transmits the predefined steering angle to the steerable wheels 110 of the motor vehicle by means of a displacement of the track rods 108.

An electrical power assistance means may be provided in the form of a power assistance means 112 coupled at the input side to the steering shaft 1, of a power assistance means 114 coupled to the pinion 104, and/or of a power assistance means 116 coupled to the toothed rack 106. The respective power assistance means 112, 114 or 116 couples an auxiliary torque into the steering shaft 1 and/or the steering pinion 104 and/or an auxiliary force into the toothed rack 106, whereby the driver is assisted in performing steering work. The three different power assistance means 112, 114 and 116 illustrated in FIG. 1 show possible positions for the arrangement thereof.

Normally, only a single one of the positions shown is occupied by a power assistance means 112, 114 or 116. The auxiliary torque or the auxiliary force which is to be imparted by the respective power assistance means 112, 114 or 116 for the purpose of assisting the driver is determined to take into consideration a steering moment input by the driver and detected by a torque sensor 118. Alternatively or in combination with the introduction of the auxiliary torque, an additional steering angle can be introduced into the steering system by the power assistance means 112, 114, 116, which additional steering angle is added to the steering angle imparted by the driver using the steering wheel 102.

The steering shaft 1 comprises, at the input side, an input shaft 10 connected to the steering wheel 102 and, at the output side, an output shaft 12 connected to the toothed rack 106 via the steering pinion 104. The input shaft 10 and the output shaft 12 are coupled to one another in a rotationally elastic manner by means of a torsion bar which is not shown in FIG. 1. Thus, a torque input into the steering shaft 10 by the driver using the steering wheel 102 leads to a relative rotation of the input shaft 10 with respect to the output shaft 12 whenever the output shaft 12 does not rotate exactly synchronously with respect to the input shaft 10. This relative rotation between input shaft 10 and output shaft 12 can be measured by means of a rotational angle sensor and, correspondingly, on the basis of the known torsional stiffness of the torsion bar, a corresponding input torque relative to the output shaft 12 can be determined. In this way, through the determination of the relative rotation between input shaft 10 and output shaft 12, the torque sensor 118 is formed. A torque sensor 118 of said type is known in principle and may for example be realized by means of an electromagnetic sensor arrangement, as described further below, or by either means of measurement of the relative rotation.

Correspondingly, a steering moment imparted to the steering shaft 1 or to the input shaft 10 by the driver using the steering wheel 102 will give rise to the introduction of an auxiliary torque by one of the power assistance means 112, 114, 116 only if the output shaft 12 is rotated relative to the input shaft 10 counter to the torsional resistance of the torsion bar.

The torque sensor 118 may also alternatively be arranged at the position 118, wherein then, the division of the steering shaft 1 into input shaft 10 and output shaft 12 and the rotationally elastic coupling by means of the torsion bar are correspondingly present at a different position in order, from the relative rotation of the output shaft 12 coupled to the input shaft 10 via the torsion bar, to be able to determine a relative rotation and thus correspondingly an input torque and/or an auxiliary torque to be introduced.

The steering shaft 1 as per FIG. 1 furthermore comprises at least one cardanic joint 120, by means of which the profile of the steering shaft 1 in the motor vehicle can be adapted to the spatial conditions.

The input shaft 10 of the steering shaft 1, to which the steering wheel 102 is attached in the illustrated example, is designed according to the invention as a variable-length steering shaft 10. The outer part of the steering shaft 10 of telescopic construction is formed by a steering spindle part 3.

Figure 2:
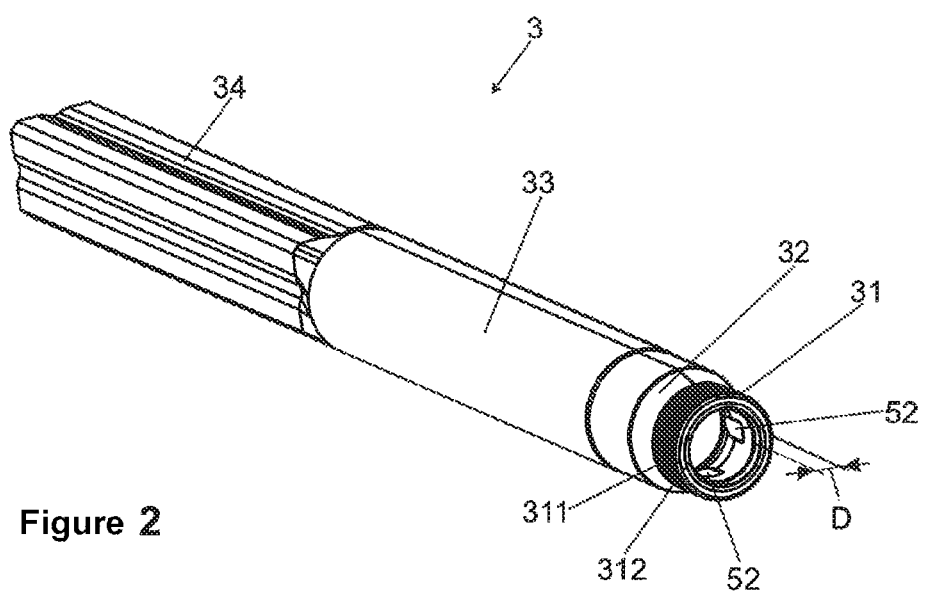
FIG. 2 is a perspective view of an example steering spindle part.

FIG. 2 shows the steering spindle part 3 which, in the motor vehicle steering system 100 as per FIG. 1, forms that part of the input shaft 10 to which, at the rear end in relation to the direction of travel, the steering wheel 102 is attached. The steering wheel 102, which is not illustrated in FIG. 2, is attached to a connecting portion 31, which is formed at that end region of the steering spindle part 3 which faces toward the viewer in FIG. 2. The connecting portion 31 may be equipped on the outside with an external toothing 311, and on the inside with an internal thread 312, which in this case is merely schematically illustrated in order to give an improved overview. Onto the external toothing 311, which is formed for example as a spline toothing, a steering wheel 102 can be mounted in positively locking fashion by way of a corresponding internal toothing, and fixed by virtue of a screw being screwed into the internal thread 312.

In the connecting portion 31, the wall thickness is D.

The connecting portion 31 is adjoined in a longitudinal direction—forward in relation to the direction of travel—by a conically widening portion 32, which in turn is adjoined by a tube portion 33. The tube portion 33 transitions into a steering moment transmission portion 34, which is equipped with a contour that deviates from a circular arc. A further steering spindle part (not illustrated here) is inserted axially, that is to say telescopically in the longitudinal direction, into said steering moment transmission portion in order to form a torque-transmitting connection which is telescopic for the purposes of adjusting the position of the steering wheel 102. The steering torque transmission portion 34 may be formed in particular with a arcuate toothing formed over the circumference or a cloverleaf profile, which corresponds to the cross section of the telescopic steering spindle part in order to form a connection which is positively locking with respect to rotation and fixed in terms of torque.

Figure 3:
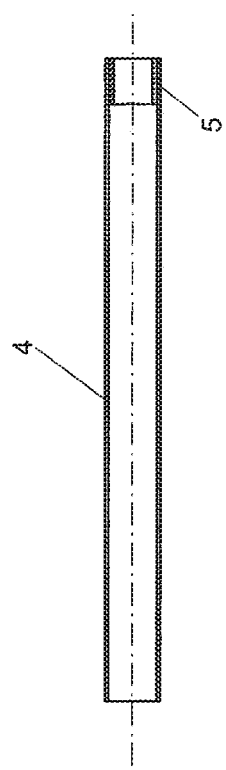
FIG. 3 is a perspective view of an example tube and an example sleeve prior to insertion.
Figure 5:
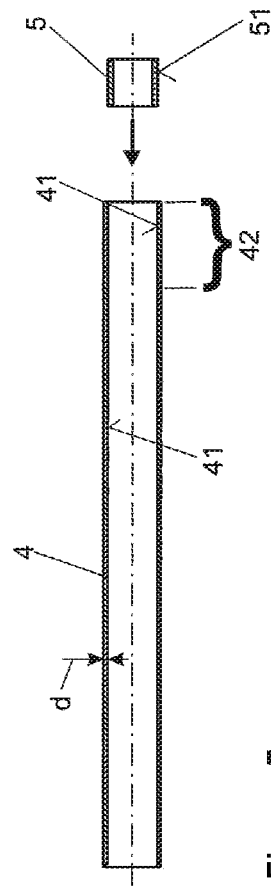
FIG. 5 is a longitudinal sectional view through the example tube and sleeve in FIG. 3.

As illustrated in FIGS. 3 and 5, as a starting product for producing a steering spindle part 3, a hollow cylindrical tube 4 is provided, which comprises a uniform wall thickness d over its entire longitudinal extent, and a likewise hollow cylindrical sleeve 5. The tube 4 comprises an inner surface 41 which is smooth in the circumferential direction and which is in the shape of a cylindrical shell and comprises a cross section in the shape of a circular line, and which comprises no structures protruding radially from the inner surface or recessed into said inner surface. The sleeve 5 comprises an outer surface 51 which is smooth in the circumferential direction and which is likewise in the shape of a cylindrical shell with a cross section in the shape of a circular line, and which likewise comprises no radial projections or depressions.

The wall thickness d of the tube 4 is selected to be only as large as is necessary for the stability of the steering spindle part 3, in particular for the transmission of the occurring torques.

The outer diameter of the sleeve 5 and the inner diameter of the tube 4 are selected such that the sleeve 5 can be inserted in a frictionally locking manner in a longitudinal direction into an end portion 42 of the tube 4, that is to say can be axially pressed in, as indicated by the arrow in FIGS. 3 and 5.

Figure 4:
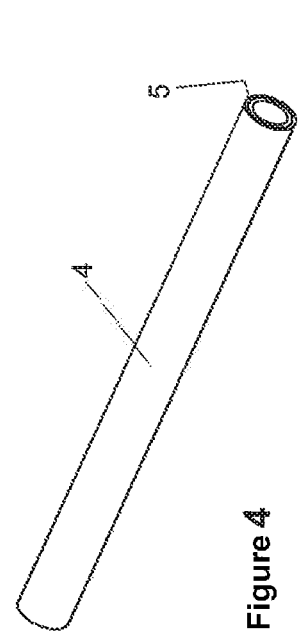
FIG. 4 is a perspective view of an example tube and an example sleeve after insertion.
Figure 6:
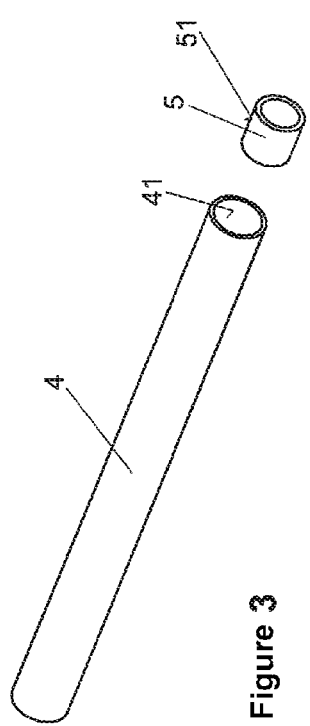
FIG. 6 is a longitudinal sectional view through the example tube and sleeve in FIG. 4.

After the insertion, the state illustrated in FIGS. 4 and 6 is attained, in which the sleeve 5 terminates flush with the end of the tube 4.

Figure 7:
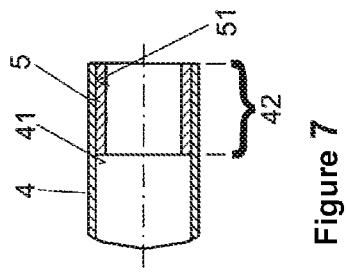
FIG. 7 is a detail view of FIG. 6.

FIG. 7 illustrates an enlarged longitudinal section showing how the sleeve 5 is seated in frictionally locking fashion in the end portion 42 of the tube.

Figure 8:
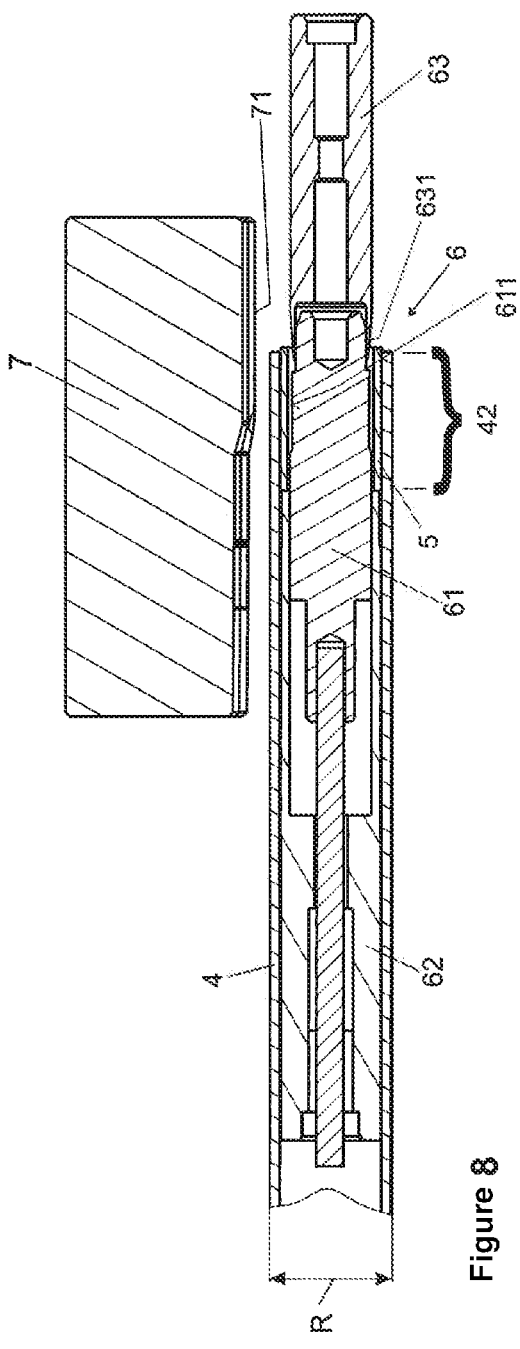
FIG. 8 is a longitudinal sectional view through an example steering spindle part in a deforming device prior to deformation.

In the next step, a mandrel 6 is introduced into the tube 4 and the sleeve 5, as illustrated in longitudinal section in FIG. 8. The mandrel 6 is formed in three parts and comprises a deforming mandrel 61, a first supporting mandrel 62 and a second supporting mandrel 63. The deforming mandrel 61 is, in the longitudinal direction, positioned in the end portion 42 in the opening of the sleeve 5 and lies with its outer machining surface against the sleeve 5 from the inside. The first supporting mandrel 62 is positioned in the adjoining portion of the tube 4 and, there, lies against the inner surface 41 of the tube 4. The second supporting mandrel 63 comprises a bore in which a pin of the deforming mandrel 61 is received and supports said pin radially. Furthermore, the second supporting mandrel 63 comprises a conical outer surface portion 631, which projects at least partially into the end portion 42. The deforming mandrel 61 and the second supporting mandrel 63 do not lie axially against one another in the longitudinal direction, that is to say the deforming mandrel 61 and the second supporting mandrel 63 are not moved into a block state.

Figure 12:
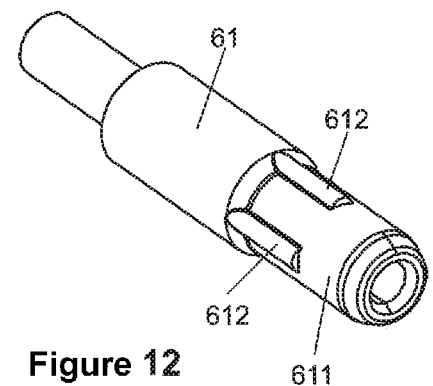
FIG. 12 is a perspective view of an example deforming mandrel.

The deforming mandrel 61 is illustrated in an enlarged perspective view in FIG. 12. In this figure, it can be seen that said deforming mandrel comprises a cylindrical molding surface 611 which comprises outwardly protruding molding projections 612 which are formed as ribs which run in a longitudinal direction and which comprise a rounded cross section. In the example shown, four of these molding projections 612 are arranged so as to be distributed uniformly over the circumference.

For the deformation, the mandrel 6 with the tube 4 and the sleeve 5 is arranged in a deforming device with a hammering tool 7. It is preferable for multiple hammering tools 7 to be arranged in the deforming device so as to be distributed uniformly over the circumference. To illustrate the principle, in each case only one hammer head 7 is shown in the simplified illustration of FIGS. 8 and 9.

As can be seen in FIG. 8, the tube 5 initially comprises a continuously uniform diameter R over its entire length, even in the end region 42. During the deformation, by means of the hammering tool 7, impacts are exerted in a radial direction on the end region 42 of the tube 4, as indicated by the double arrow in FIG. 9. Between individual hammer impacts, the mandrel 6 together with tube 4 and sleeve 5 is rotated continuously, as indicated by the curved arrow. In this way, by means of the hammer surface 71 of the hammering tool 7, the entire outer circumference is deformed in a sequence of hammer impacts.

Figure 9:
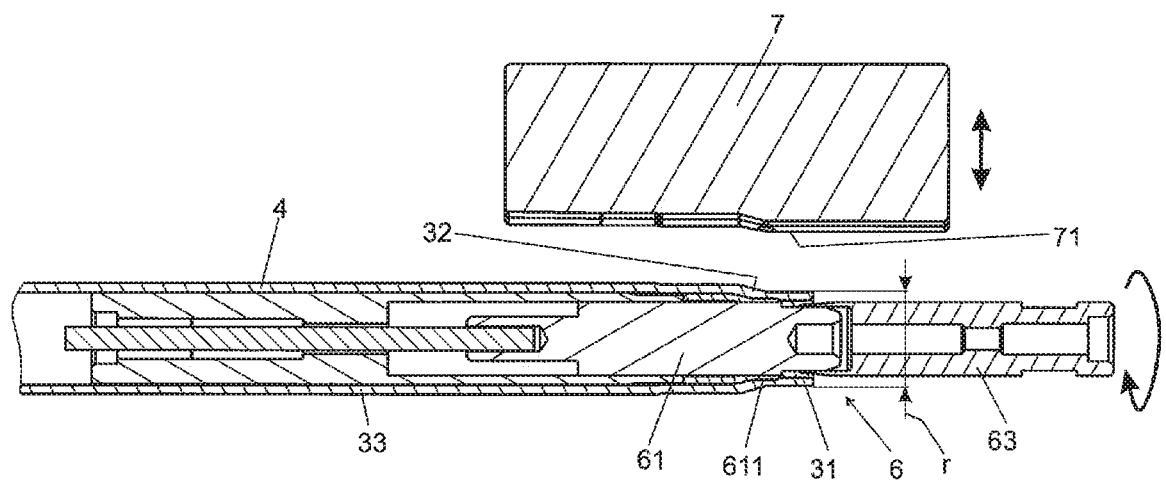
FIG. 9 is a longitudinal sectional view through an example steering spindle part in a deforming device after deformation.
Figure 11:
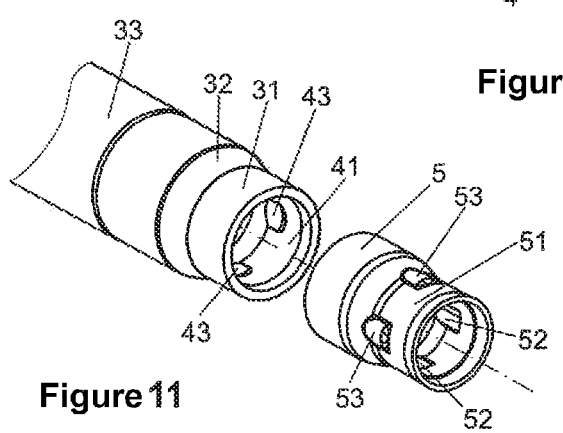
FIG. 11 is an exploded view of the deformed steering spindle part as per FIG. 9.

Upon the impacting of the hammer surface 71, the tube 4 is, in the end region 42, deformed radially inward against the sleeve 5. The sleeve 5 is itself plastically deformed by the deforming pressure and, in the process, is reduced in diameter. In the final state as illustrated in FIG. 9, on the tube 4, the end portion 42 has been deformed into the connecting portion 31, the diameter r of which is smaller than the diameter R of the tube 4. During the deformation, the sleeve 5 comes into continuous contact with the molding surface 611 of the deforming mandrel 61. Here, the molding projections 612 are plastically molded from the inside into the inner side of the sleeve 5 so as to form indentations 52, as can be seen in FIG. 11, which shows the individual parts after the deformation as per FIG. 9 in the exploded state.

Figure 10:
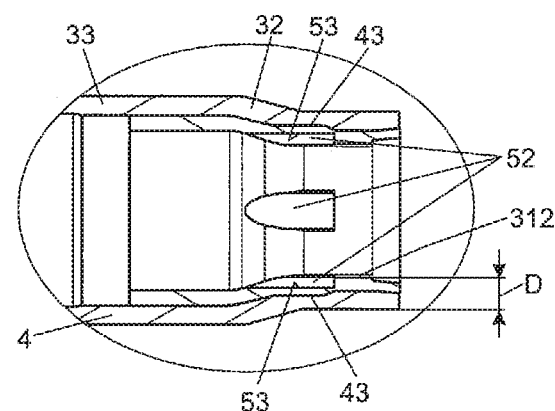
FIG. 10 is a detail view of a fully-deformed steering spindle part as per FIG. 9.

Owing to the indentations 52, projections 53 which protrude from the outer surface 51 of the sleeve 5 are plastically pushed out, which projections form positive-locking elements according to the invention on the sleeve 5. During the deformation, said projections 53 press radially from the inside into the inner surface 41 of the tube 4, whereby depressions 43 are formed in, which form positive-locking elements according to the invention in the tube 4. As can be seen in the enlarged sectional illustration of FIG. 10, the projections 53 of the sleeve 5 engage in positively locking fashion into the depressions 43 of the tube 4.

Figure 13:
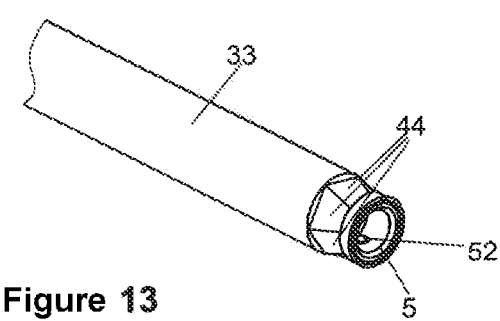
FIG. 13 is a perspective view of still another example steering spindle part.

It is alternatively or additionally possible, as in the embodiment as per FIG. 13, for polygon surfaces 44 arranged so as to be distributed over the circumference to be formed during the deformation. In this way, during the joint deformation according to the invention, the sleeve 5 and the tube 4 are, in the connecting portion 31, formed as polygonal elements which engage into one another in positively locking fashion, for example as hexagons. Said polygonal elements may be of conical form, like the polygonal surfaces 44 in FIG. 13.

All of the examples shown have in common the fact that, according to the invention, the positive-locking elements, for example the projections 53 and the depressions 43, or else the polygon surfaces 44, are not formed in in advance in a separate machining step as in the prior art, but rather are produced during the joint deformation of tube 4 and sleeve 5. This permits more economical manufacture, and an improved connection of sleeve 5 and tube 4.

LIST OF REFERENCE DESIGNATIONS

1 Steering shaft
10 Input shaft
12 Output shaft
100 Motor vehicle steering system
102 Steering wheel
103 Steering gear
104 Steering pinion
106 Toothed rack
108 Track rod
110 Steerable wheel
112 Power assistance means
114 Power assistance means
116 Power assistance means
118 Torque sensor
118' Torque sensor
120 Joint
3 Steering spindle part
31 Connecting portion
311 External toothing
312 Internal thread
32 Conical portion
33 Tubular portion
34 Steering moment transmission portion
4 Tube
41 Inner surface
42 End portion
43 Depressions
44 Polygon surfaces
5 Sleeve
51 Outer surface
52 Indentation
53 Projection
6 Mandrel
61 Deforming mandrel
611 Molding surface
612 Molding projections
62 First supporting mandrel
63 Second supporting mandrel
7 Hammering tool
71 Hammer surface

What is claimed is:

1. A method for producing a steering spindle part that forms a portion of a steering spindle for a motor vehicle, wherein the steering spindle part is configured as a hollow shaft with a connecting portion at least at one end of the hollow shaft, wherein at least a portion of a length of the connecting portion has an increased wall thickness relative to a portion of the steering spindle part that adjoins the connecting portion, the method comprising:
providing a hollow cylindrical tube with an inner surface that is smooth in a circumferential direction and that comprises a circular cross section;
providing a hollow cylindrical sleeve that includes an outer surface that is smooth in a circumferential direction and that comprises a circular cross section;
inserting the hollow cylindrical sleeve into an end portion of the hollow cylindrical tube; and
jointly deforming the end portion of the hollow cylindrical tube and the hollow cylindrical sleeve, wherein a flow of material of the hollow cylindrical tube and the hollow cylindrical sleeve occurs, the flow forming positively locking elements on the hollow cylindrical tube and the hollow cylindrical sleeve, which positively locking elements engage into one another in the circumferential direction to generate positive locking that acts in the circumferential direction, wherein the joint deformation comprises:
introducing a mandrel with a non-circular cross section into the hollow cylindrical sleeve, and
exerting an external deformation pressure on the hollow cylindrical tube with a deformation tool that physically contacts the hollow cylindrical tube to mold the hollow cylindrical tube and the hollow cylindrical sleeve jointly on the mandrel.

2. The method of claim 1 wherein the joint deformation comprises deforming the circular cross sections of the hollow cylindrical tube and the hollow cylindrical sleeve into a non-circular shape.

3. The method of claim 1 comprising forming a coupling portion into an inner wall of the hollow cylindrical sleeve after the joint deformation of the end portion of the hollow cylindrical tube and the hollow cylindrical sleeve.

4. The method of claim 3 wherein the coupling portion comprises an internal thread in the hollow cylindrical sleeve.

5. The method of claim 3 wherein the coupling portion comprises a circumferential contour that is a triangle, a hexagon, or an octagon.

6. The method of claim 1 wherein the positively locking elements are formed by jointly deforming cross-sections of the hollow cylindrical tube and the hollow cylindrical sleeve into a non-circular shape.

7. The method of claim 1 wherein the deformation comprises swaging.

8. A method for producing a steering spindle part that forms a portion of a steering spindle for a motor vehicle, wherein the steering spindle part is configured as a hollow shaft with a connecting portion at least at one end of the hollow shaft, wherein at least a portion of a length of the connecting portion has an increased wall thickness relative to a portion of the steering spindle part that adjoins the connecting portion, the method comprising:
providing a hollow cylindrical tube with an inner surface that is smooth in a circumferential direction and that comprises a circular cross section;

providing a hollow cylindrical sleeve that includes an outer surface that is smooth in a circumferential direction and that comprises a circular cross section;

inserting the hollow cylindrical sleeve into an end portion of the hollow cylindrical tube; and jointly deforming the end portion of the hollow cylindrical tube and the hollow cylindrical sleeve, wherein a flow of material of the hollow cylindrical tube and the hollow cylindrical sleeve occurs, the flow forming positively locking elements on the hollow cylindrical tube and the hollow cylindrical sleeve, which positively locking elements engage into one another in the circumferential direction to generate positive locking that acts in the circumferential direction, wherein cross-sections of the hollow cylindrical tube and the hollow cylindrical sleeve are jointly deformed into a non-circular shape by flattening one side of the hollow cylindrical tube and the hollow cylindrical sleeve.

9. The method of claim 8 wherein the joint deformation is performed by way of cold working.

10. The method of claim 8 wherein the end portion of the hollow cylindrical tube and the hollow cylindrical sleeve are simultaneously jointly deformed, wherein the positively locking elements are formed simultaneously as the end portion of the hollow cylindrical tube and the hollow cylindrical sleeve are jointly deformed.

11. The method of claim 8 wherein the joint deformation comprises deforming the hollow cylindrical tube and the hollow cylindrical sleeve to include the positively locking elements disposed circumferentially on opposite sides of the hollow cylindrical tube and the hollow cylindrical sleeve.

12. The method of claim 8 wherein the joint deformation comprises deforming the hollow cylindrical tube and the hollow cylindrical sleeve to include the positively locking elements disposed circumferentially in a form of an irregular polygon.

13. The method of claim 8 comprising forming a coupling portion into an inner wall of the hollow cylindrical sleeve after the joint deformation of the end portion of the hollow cylindrical tube and the hollow cylindrical sleeve.

14. The method of claim 8 wherein the joint deformation comprises deforming a circular cross-section of the hollow cylindrical tube and the hollow cylindrical sleeve to include flattened portions distributed symmetrically over a circumference of the hollow cylindrical tube and the hollow cylindrical sleeve.

15. A method for producing a steering spindle part that forms a portion of a steering spindle for a motor vehicle, wherein the steering spindle part is configured as a hollow shaft with a connecting portion at least at one end of the hollow shaft, wherein at least a portion of a length of the connecting portion has an increased wall thickness relative to a portion of the steering spindle part that adjoins the connecting portion, the method comprising:

providing a hollow cylindrical tube with an inner surface that is smooth in a circumferential direction and that comprises a circular cross section;

providing a hollow cylindrical sleeve that includes an outer surface that is smooth in a circumferential direction and that comprises a circular cross section;

inserting the hollow cylindrical sleeve into an end portion of the hollow cylindrical tube; and jointly deforming the end portion of the hollow cylindrical tube and the hollow cylindrical sleeve, wherein a flow of material of the hollow cylindrical tube and the hollow cylindrical sleeve occurs, the flow forming positively locking elements on the hollow cylindrical tube and the hollow cylindrical sleeve, which positively locking elements engage into one another in the circumferential direction to generate positive locking that acts in the circumferential direction, wherein the joint deformation comprises deforming the hollow cylindrical tube and the hollow cylindrical sleeve to include the positively locking elements configured as flattened portions disposed circumferentially in polygonal prismatic form.

16. The method of claim 15 wherein the polygonal prismatic form is a regular triangle, a tetragon, a pentagon, or a hexagon.

17. The method of claim 15 wherein the joint deformation comprises reducing outer and inner diameters of the hollow cylindrical tube and the hollow cylindrical sleeve at least over a portion of a common length extant of the hollow cylindrical tube and the hollow cylindrical sleeve.

18. The method of claim 15 wherein the joint deformation to include the positively locking elements configured as flattened portions further comprises forming a conical portion that narrows in a direction of an adjacent end of the hollow cylindrical tube of the steering spindle part, and a hollow cylindrical portion that is disposed further in the direction of the adjacent end relative to the conical portion.

19. The method of claim 15 wherein the joint deformation comprises deforming the hollow cylindrical tube and the hollow cylindrical sleeve to include the positively locking elements disposed circumferentially in a form of an irregular polygon.

20. The method of claim 15 comprising forming a coupling portion into an inner wall of the hollow cylindrical sleeve after the joint deformation of the end portion of the hollow cylindrical tube and the hollow cylindrical sleeve.

* * * * *